March 7, 1967 D. C. WESTON 3,308,471
INDOOR AERIAL MOUNTED ON FLOOR-TO-CEILING STANDARD
Filed March 18, 1963 4 Sheets-Sheet 1
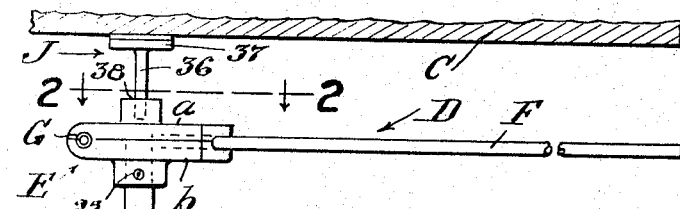
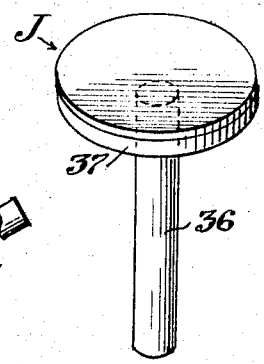
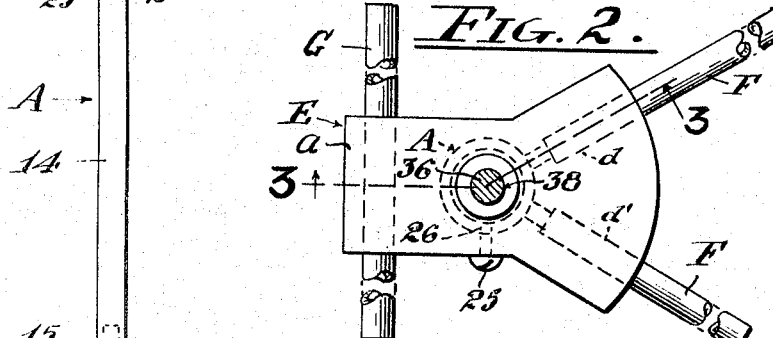
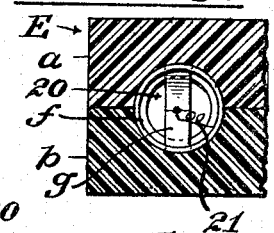
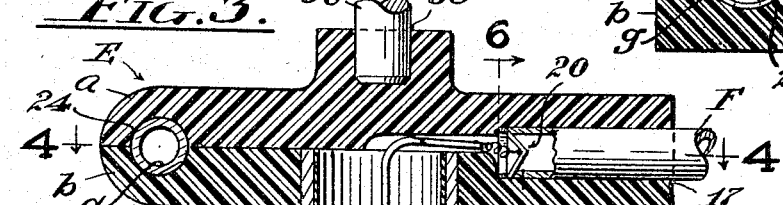
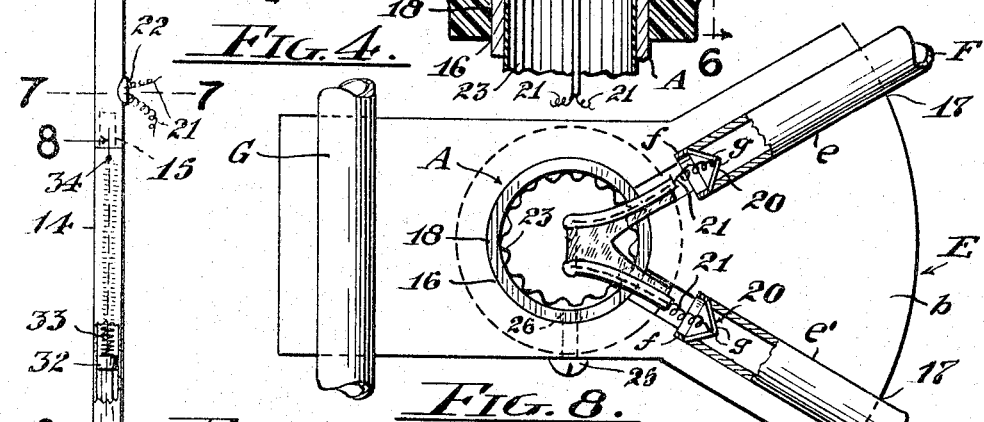
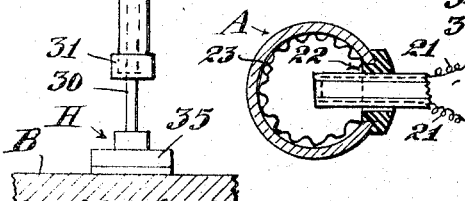
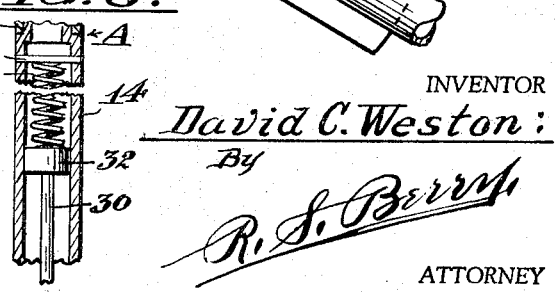
INVENTOR
David C. Weston;
By
R. S. Berry
ATTORNEY March 7, 1967     D. C. WESTON     3,308,471
INDOOR AERIAL MOUNTED ON FLOOR-TO-CEILING STANDARD
Filed March 18, 1963     4 Sheets-Sheet 2
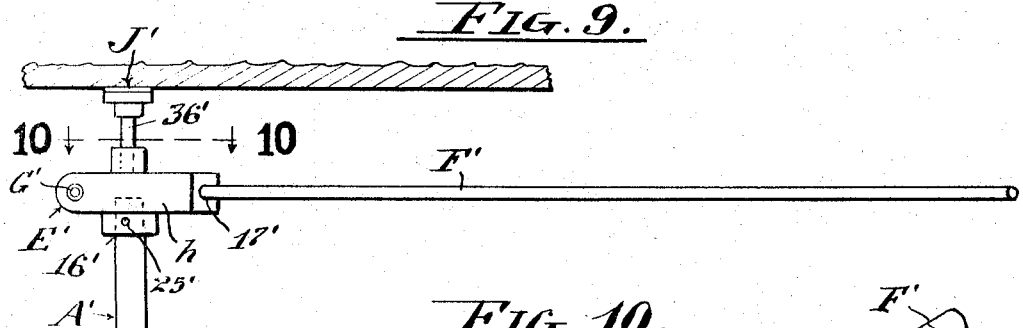
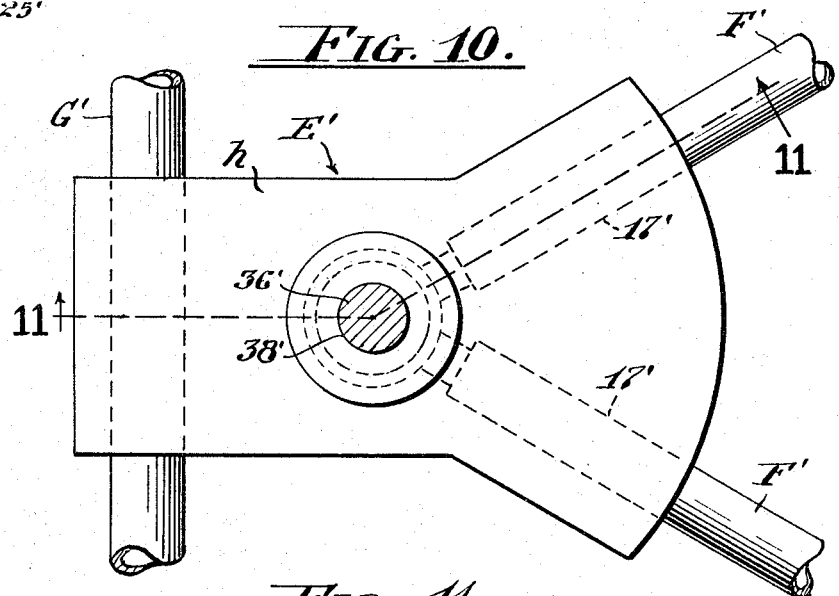
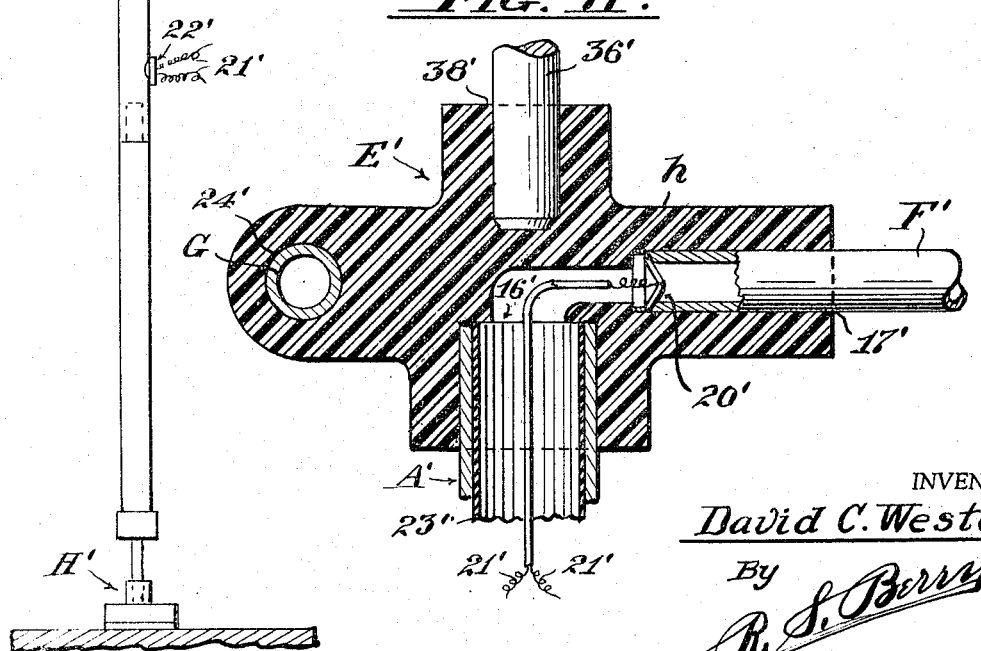
INVENTOR
David C. Weston;
By R. S. Berry
ATTORNEY

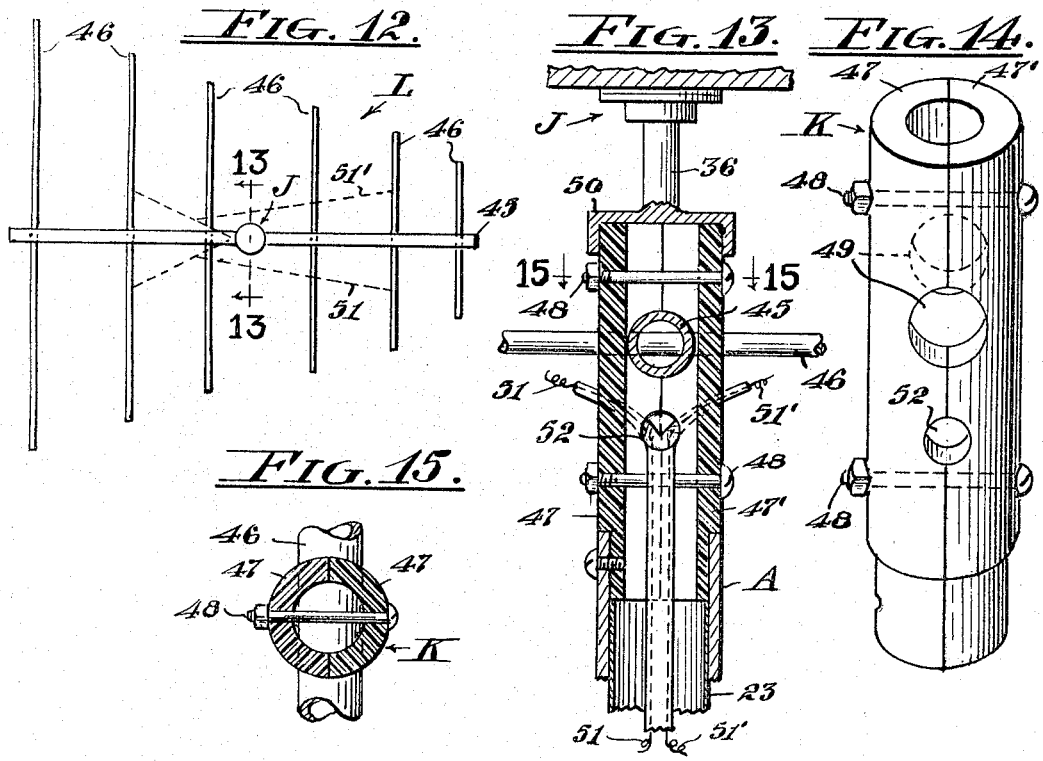
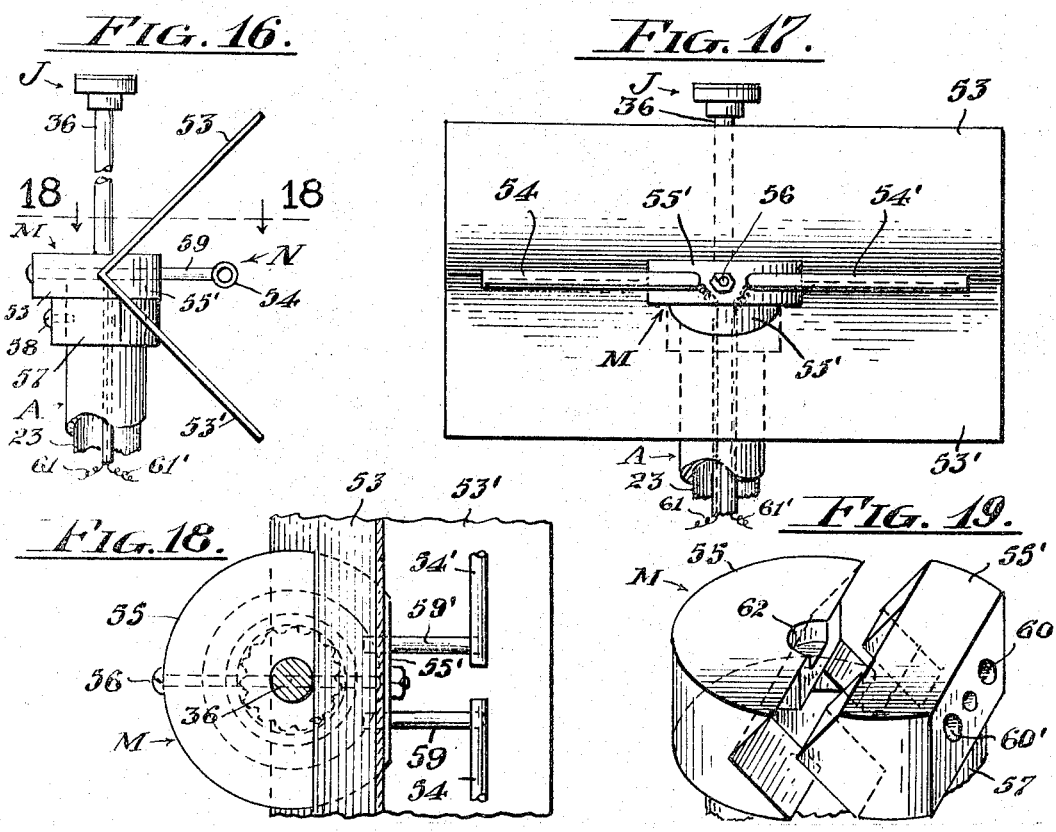

March 7, 1967 D. C. WESTON 3,308,471
INDOOR AERIAL MOUNTED ON FLOOR-TO-CEILING STANDARD
Filed March 18, 1963 4 Sheets-Sheet 4
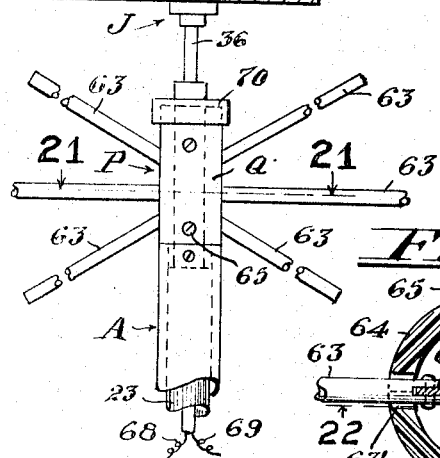
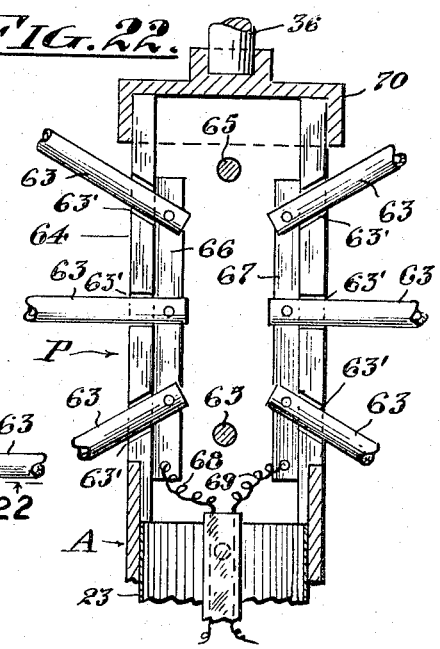
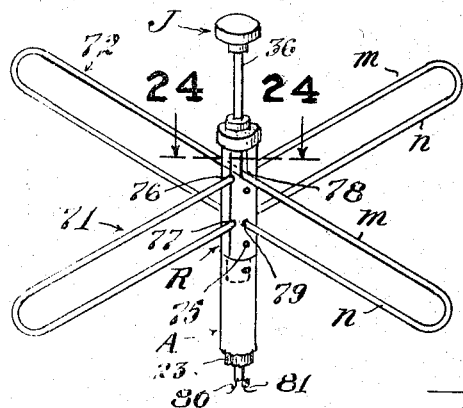
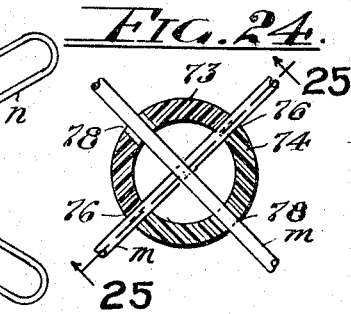
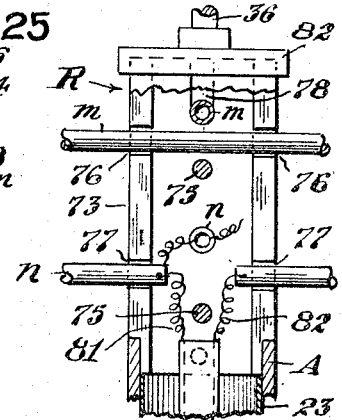
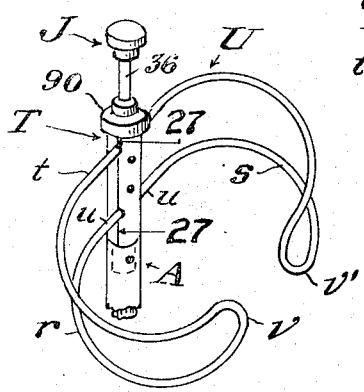
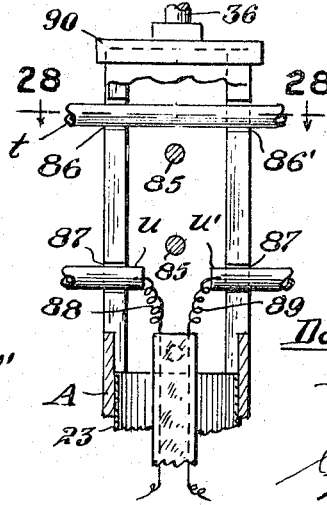
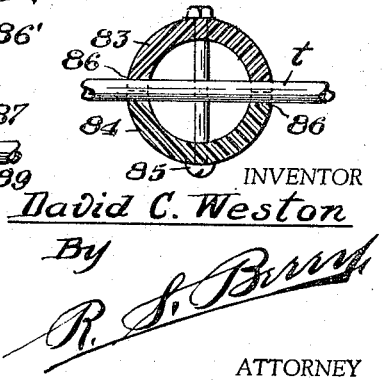
INVENTOR
David C. Weston
By
R. S. Burns
ATTORNEY

United States Patent Office 3,308,471
Patented Mar. 7, 1967

3,308,471
INDOOR AERIAL MOUNTED ON FLOOR-TO-CEILING STANDARD
David C. Weston, 3003 W. 48th St.,
Los Angeles, Calif. 90043
Filed Mar. 18, 1963, Ser. No. 265,883
3 Claims. (Cl. 343—882)

The present invention relates to improvements in aerials for radio wave reception and particularly pertains to a mounting for supporting radio antennas.

The primary object of the invention is to provide an aerial which is especially applicable for use indoors, particularly in apartments where outside aerials are not available.

Another object is to provide an antenna and a support therefor which is adapted to be installed in a room at various locations therein, independent of a receiving apparatus, by means of which the conventional outdoor TV and FM antenna may be employed indoors in rooms occupied by persons moving about, and whereby the antenna will be disposed in an elevated position such as to afford ample head-room for persons walking therebeneath.

Another object is to provide an antenna support of the above character which is adapted to be readily turned to present antenna elements thereon toward any desired point of the compass, whereby radio reception may be obtained from broadcasting stations, within range, located in any direction relative to the installed aerial.

Another object is to provide an aerial embodying a standard adapted to be supported at its ends between a floor and an overhead structure, wherein the aerial is sectional and subject to being disassembled to form a compact package for shipping and storage purposes, and wherein the parts may be readily assembled when the aerial is to be installed.

Another object is to provide an aerial embodying a header demountably supported on a standard wherein the header serves as a mounting and support for antenna elements and is subject to being contoured to adapted it for detachable reception of the elements of antennas of various forms, including V antennas, end-fire parasitic arrays of dipole or folded dipole antennas, corner reflector dipole antennas, various forms of conical antennas, omnidirectional right-angled mounted dipole antennas, and omnidirectional circular folded dipole antennas.

A further object is to provide an aerial embodying a tubular standard through which transmission lines lead interiorly thereof from the antenna carried thereon whereby such transmission lines are shielded from extraneous signals such as electromagnetic disturbances developed by passing powered vehicles, neighboring diathermy apparatus, radio transmitting stations, and the like, and whereby bodily interference with the received signal while adjusting the antenna during use is eliminated.

With the foregoing objects and advantages in view together with such other objects and advantages as may subsequently appear the invention resides in the parts and in the combination, construction and arrangement of parts hereinafter described and claimed, and illustrated in the accompanying drawing, in which:

FIG. 1 is a view in side elevation showing the aerial as applied; and depicting the invention as adapted to the employment of V antennas;

FIG. 2 is a detail in horizontal section and plan as seen on the line 2—2 of FIG. 1 depicting the antenna supporting header with portions broken away;

FIG. 3 is a view in enlarged vertical section taken on the line 3—3 of FIG. 2 showing the manner of mounting the antenna supporting header on a standard;

FIG. 4 is a horizontal section and plan view as seen on the line 4—4 of FIG. 3;

FIG. 5 is an isometric view of a bearing element for application to the upper end of the aerial standard to extend between the antenna support and an overhead structure;

FIG. 6 is a cross section and elevation as seen on the line 6—6 of FIG. 3;

FIG. 7 is an enlarged cross section taken on the line 7—7 of FIG. 1;

FIG. 8 is a fragmentary detail in vertical section and elevation as seen on the line 8—8 of FIG. 1;

FIG. 9 is a view in elevation depicting a modified form of the antenna supporting header;

FIG. 10 is a view in cross section and plan as seen on the line 10—10 of FIG. 9;

FIG. 11 is a detail in vertical section, partly in elevation taken on the line 11—11 of FIG. 10;

FIG. 12 is a plan view of an aerial embodying the invention as adapted to employ an antenna of the end fire parasitic array type;

FIG. 13 is an enlarged detail in section and elevation as seen on the line 13—13 of FIG. 12;

FIG. 14 is an isometric view of the antenna supporting head shown in FIGS. 12 and 13;

FIG. 15 is a horizontal section and plan view taken on the line 15—15 of FIG. 13;

FIG. 16 is a view in side elevation of an aerial embodying the invention as adapted to employ an antenna of the corner reflector dipole type;

FIG. 17 is a front view of the aerial shown in FIG. 16;

FIG. 18 is a horizontal section and plan view as seen on the line 18—18 of FIG. 16;

FIG. 19 is an isometric view of the antenna supporting head shown in FIGS. 16-17-18 showing it disassembled;

FIG. 20 is a view in front elevation of an aerial embodying the invention as adapted to employ an antenna of the conical type;

FIG. 21 is a view in enlarged cross section and plan as seen on the line 21—21 of FIG. 20;

FIG. 22 is a vertical section and elevation taken on the line 22—22 of FIG. 21;

FIG. 23 is an isometric view of an aerial embodying the invention as adapted to employ an antenna of the omnidirectional right-angle mounted dipole type;

FIG. 24 is a detail in horizontal section and plan taken approximately on the line 24—24 of FIG. 23;

FIG. 25 is a view in vertical section and elevation as seen on the line 25—25 of FIG. 24;

FIG. 26 is an isometric view of an aerial embodying the invention as adapted to employ an antenna of the omnidirectional circular folded dipole type;

FIG. 27 is an enlarged vertical section and elevation as seen on the line 27—27 of FIG. 26; and FIG. 28 is a horizontal section and plan view as seen on the line 28—28 of FIG. 27.

Referring to the drawings by reference characters, wherein corresponding reference characters denote corresponding elements throughout the several views, A indicates generally a standard adapted to extend and be supported vertically between a floor B and an overhead rigid abutment or structure C such as the ceiling of a room, which standard serves as a mounting for a radio wave receiving antenna D.

The standard A is here shown as comprising an elongated metallic tube consisting of a multiple of separable aligned sections 14 connected together by telescopic joints 15 in a conventional manner.

Mounted on the upper end of the standard A is an antenna supporting header E constituting the base portion of an antenna D and affording a mounting for the antenna elements shown in FIGS. 1 to 11 inclusive as comprising a pair of rods F—F and a reflector rod G of a V antenna. In the construction shown in FIGS. 1 to 4, inclusive, the antenna supporting header E embodies a pair of superimposed blocks a–b of a suitable dielectric material, such as glass, porcelain, hard rubber or a plastic having requisite stability and insulating properties; the pair of blocks a–b being provided to facilitate initial assemblage of the header E and then being rigidly joined together, as will be later described.

The header E has a cylindrical recess 16 on its underside intermediate its ends into which the upper end of the standard is inserted from the underside of the header to seat the header on the standard 17 as particularly shown in FIGS. 1 and 3.

One end portion of the header E is enlarged laterally to accommodate the pair of diverging antenna rods F—F which are designed to project from the enlarged end of the header E on a plane beneath the overhead structure C in proximate but spaced relation thereto when the aerial is applied.

As a means for demountably supporting the antenna rods on the header E the enlarged end of the latter is provided with a pair of laterally diverging straight cylindrical passages 17—17 into which the inner end portions of the rods F—F are mounted to have telescopic engagement with the header. The passages 17—17 have diameters substantially corresponding to the diameters of the rods F—F so as to receive the cylindrical inner end of the rods F—F with a sliding fit.

The passages 17—17 lead longitudinally of the header E and diverge from the recess 16 in the latter in such angular relation to each other as to determine the desired angular relation of the rods F—F which relation is subject to variation, usually ranging between 60° and 180°.

Mounted in the passages 17—17 adjacent the inner ends thereof are cylindrical electrically conductive contact elements 20—20 adapted to abut the inner ends of the antenna rods F—F positioned in the passages 17—17 and leading from the contact elements 20—20 and conductively attached thereto is a pair of insulated wave transmitting lines 21—21 which lead through the header E into the recess 16 and into the standard A and lead downwardly therethrough to a suitable point and then pass through a grommet lined aperture 22 in the standard and are connected to a receiving apparatus (not shown) in the usual manner.

The portion of the inner surface of the standard opposite the transmission lines 21—21 is lined with a sheet 23 of insulating material, such as corrugated paper, as a protecting against accidental grounding of the lines on the standard and to co-act with the metal of the standard to shield the lines against extraneous disturbances.

The end portion of the header E opposite that supporting the diverging rods F—F has a transverse cylindrical bore 24 leading therethrough arranged with the axis thereof extending coplanar with the axes of the passages 17—17 and snugly supported in the bore 24 is the reflector rod G which extends equi-distant from the sides of the header E and on a plane with the diverging rods F—F to serve as a wave reflector.

On mounting the header E on the upper end of the standard A the assemblage is fixedly yet separably interconnected by a set screw 25 which passes through the header E at one side thereof and is threaded in an opening 26 in the standard A, so that the antenna D may be swung to various positions around a vertical axis by turning the standard A, the header E being telescoped over the upper end 18 of the standard with a sliding fit.

The lower end of the standard A is equipped with a resiliently mounted base element H on which the standard is adapted to seat, which element embodies a shaft 30 reciprocally carried in the lower section 14 of the standard and extending through and guided by a cap 31 on the lower end of the standard. The end portion of the shaft within the standard terminates in a flange 32 which slidably conforms to the interior of the standard. A helical thrust spring 33 is interposed between the flanged upper end of the shaft 30 and an abutment 34 on the standard, which spring normally disposes the shaft in an advanced position. The outer end of the shaft 30 is fitted with a shoe 35 adapted to seat on the floor B.

The upper end of the aerial is equipped with a bearing element J comprising a stem 36 having an outer portion terminating in a flange 37 and having a cylindrical inner end adapted to loosely seat in a recess 38 on the header E arranged to dispose the stem 36 in axial alignment with the standard A, with the flange 37 abutting the overhead support C, as shown in FIG. 1.

In construction the header E as shown in FIGS. 1 to 4 inclusive, the section a–b thereof are each formed with recesses d–d' and e–e' respectively on the abutting faces thereof, which recesses are correspondingly formed and arranged on the sections so as to register with each other when the sections are positioned face-to-face to thereby form the rod receiving passages 17—17 and bore 24.

In assembling the header E, the contact elements 20—20 with the transmission lines 21—21 attached thereto are applied to the block section b. As here shown the contact elements 20—20 embody metallic rings f having external diameters corresponding to the diameters of the cylindrical passages 17—17, which rings are frictionally seated in the inner end portions of the passages 17—17, with converging spring tongues g on the rings presented toward the outer end of the header E and adapted to extend into the open ends of the antenna rods F—F positioned in the passages 17—17. The elements 20—20 are thus disposed with the lines 21—21 leading therefrom through the portion of the recess 16 in the block b to the exterior thereof. The block a is then applied to the block b in engagement with the elements 20—20. The blocks a–b are then fastened together in a conventional fashion as by means of an adhesive.

In assembling the aerial, the header E is seated on the end 18 of the upper section 14 of the standard A with such end extending into the recess 16 and with the transmission lines 21—21 passed through the recess 16 into the interior of the standard section 14 and extended longitudinally through the latter. The header E is then rigidly affixed to the section 14 by the set screw 25. The several sections 14 of the standard are then connected in line by the telescoped joints 15 with the transmission lines 21—21 leading through the intermediate section and passed therefrom through the aperture 22 for subsequent attachment to a receiving apparatus. The antenna rods F—F are then inserted longitudinally into the passages 17—17 and positioned with their inner ends abutting the contact elements 20—20 the tongues g of which extend into the interiors of the rods in intimate contact therewith. The reflector rod G is then positioned in the bore 24 with its end portions extending equi-distant from opposite sides of the header coplanar with the antenna rods F—F and terminating substantially opposite the ends of the latter in a usual manner; the rod G being retained in place by frictional engagement with the header.

The stem 36 of the upper bearing element J is then loosely seated in the recess 38 thus completing assemblage of the aerial with the antenna carried on the standard and interposed between the standard and the bearing element J in proximity to the latter. The base element H and the bearing element J constitute end supports for the standard when the aerial is assembled and by loosely connecting the elements H and J to the standard in circumferential pivotal relation thereto, the standard when mounted is turnable around its axis to extend the antenna rods horizontally in any direction.

The standard A equipped with the base element H and bearing element J has an over-all length exceeding the distance between the floor B and the overhead structure C between which the standard is to be erected, and accordingly in installing the aerial, the shaft 30 is initally retracted in opposition to the spring 33 such distance as to permit disposing the standard in an upright position with the shoe 35 seated on the floor B and the upper bearing flange 37 abutting the underside of the structure C. On the standard being thus vertically arranged the spring 33 will be placed under compression and will act to firmly clamp the standard in place. The antenna rods F—F will then extend horizontally in spaced but proximate relation to the overhead structure C. Where the aerial is installed in a room of a dwelling the antenna will be arranged close to the ceiling with ample head room therebeneath.

On the installation of the aerial being completed, the antenna may be presented in any desired direction by turning the standard A as before stated.

In the modification shown in FIGS. 9–11, the header E' comprises a single piece block h of dielectric material having a cylindrical recess 16' on its underside adapted to receive and snugly conform to the upper end of the tubular standard A' to which the block is rigidly affixed by a set screw 25'. The block h is provided with a pair of angularly related bores 17'—17' for the telescopic reception of the antenna rods F'—F', which bores lead divergently from the recess 16'. Contact elements 20'—20' are mounted in the bore 17'—17' adjacent the inner ends thereof adapted to be abutted by the inner ends of the antenna rods F'—F'. The transmission lines 21'—21' lead from the contact elements 20'—20' into the recess 16' and are extended longitudinally of the standard interiorly thereof to and through an aperture 22' therein.

The header E' is provided with a recess 38' on the upper side thereof for the reception of the stem 36' of the bearing element J' and has a transverse bore 24' for the reception of the reflector rod G'.

The standard A' is complementary to the structure described with reference to FIG. 1 and is equipped with a corresponding base element H' and liner 23'.

In the construction shown in FIGS. 12–15, the antenna supporting header K is adapted to afford a mounting for an antenna L comprising end-fire parasitic array of dipoles embodying a beam 45 fitted with a plurality of spaced transverse dipoles 46.

The header K consists of a longitudinally divided cylindrical tube, the sections 47–47' of which are clamped together on opposite sides of the beam 45 by bolts 48; the header having diametrically opposed apertures 49 through which the beam extends and is frictionally seated. One end of the header K is telescopically engaged in the upper end of the standard A, while the other end of the header is loosely encompassed by a cap 50 embodied in the bearing element J. Transmission lines 51–51' lead from the antenna L through an aperture 52 in the header from which the lines extend into and along the interior of the standard.

In the construction shown in FIGS. 16–19 the antenna supporting header M is adapted to afford a mounting for a corner reflector dipole antenna N embodying a pair of interconnected angularly disposed horizontally extending reflector plates 53–53' and a pair of dipoles 54–54' disposed longitudinally of the plates 53–53' in spaced relation thereto opposite the juncture thereof.

The header M consists of a pair of contoured members 55–55' arranged on opposite sides of the plates 53–53' at the juncture thereof and clamped in engagement therewith by a bolt 56, the members 55–55' having jointly a hub 57 adapted to encompass the upper end of the standard A to which the header M is secured by a set screw 58.

A pair of tubular brackets 59–59' project from the header M to the outer ends of which the dipoles 54—54 are attached; the header having side apertures 60–60' into which the inner ends of the tubular brackets 59–59' extend. Transmission lines 61—61 lead from the inner ends of the brackets 59–59' into the upper end of the standard A and pass interiorly of the latter.

The stem 36 of the bearing element J is loosely seated in a recess 62 in the header M which recess is located to dispose the stem 36 in axial alignment with the standard A.

In the construction shown in FIGS. 20–22 the antenna supporting header P is adapted to afford a mounting for the elements of a form of conical antennas embodying a plurality of rods 63—63 extending laterally in superimposed diverging arrangement from opposite sides of the header through apertures 63' in the latter.

The header P comprises a longitudinally divided tube Q the half sections 64–64' of which are connected together by bolts 65 to overlie the inner ends of the rods 63—63. A pair of elongated spaced parallel transmitting bars 66–67 are arranged in the header P to which the rods 63—63 are connected; the inner ends of the rods 63 at one side of the header being attached to the bar 66 and the inner ends of the rods extending from the other side of the header being attached to the bar 67. Transmission lines 68–69 lead respectively from the bars 66–67 downwardly through the interior of the standard A to the upper end of which the lower end of the header P is telescopically attached.

The upper end of the header P is slidably encompassed by a cap 70 to which the bearing element J is attached in axial alignment with the header P and the standard A.

In the construction shown in FIGS. 23–25 the antenna supporting header R is adapted to afford a mounting for the elements of an omnidirectional right-angle mounted dipole antenna S, wherein a pair of folded dipoles 71–72 are crossed at right angles to each other intermediate their ends and are mounted at their crossed portion to project radially from the header R. Each of the dipoles 71–72 embodies a pair of parallel members m–n united at their ends in continuation of each other, with the member m continuous while the member n is divided.

The header R consists of a longitudinally divided cylindrical tube, the sections 73–74 of which are connected together by bolts 75. The members m–n of the dipole 71 extend through apertures 76–77 in the header R at the juncture of the sections 73–74, with the divided portion of the member n disposed interiorly of the header.

The members m–n of the dipole 72 extend through apertures 78–79 in the header R, which apertures are arranged intermediate the longitudinal margins of the sections 73–74. In this instance the apertures 78 are in the form of open ended slots to receive the continuous member m of the dipole 72. The ends of the member m of the dipole 72 are disposed interiorly of the header R.

Transmission lines 80–81 lead from the free ends of the dipole members n and pass downwardly through the standard to which the lower end of the header R is attached. The upper end of the header R is loosely encompassed by a cap 82 to which the bearing element J is attached.

In the construction shown in FIGS. 26–28 the header T is adapted to employment of an antenna of the omnidirectional circular folded dipole type, wherein the antenna element or dipole U consists of an elongated rod having its end portions r–s folded or turned in spaced overlying relation to the intermediate portion t and with their terminals u–u' disposed in proximate but spaced relation to each other. The resultant assembly is folded into a circular formation with the ends v–v' thereof presented toward but spaced from each other.

The header T consists of a longitudinal divided cylindrical tube, the sections 83–84 of which are connected together by bolts 85 with the intermediate portion of the circular dipole U interposed therebetween; the portion t of the dipole extending diametrically through the header and the terminals u—u being disposed within the header; the header T having opposed apertures 86–86' to receive the dipole portion t and having opposed apertures 87–87' to receive the dipole terminals u—u.

Transmission lines 88–89 connect with the terminals u—u and lead downwardly through the interior of the standard to which the lower end of the header T is telescopically attached. The upper end of the header T is loosely encompassed by a cap 90 on which the bearing element J is attached.

In each of the above described constructions the standard A consists of metallic tubing lined with an insulating sheet 23 encompassing transmission lines leading through a header fixed on the standard from an antenna carried on the header, whereby the transmission lines are shielded from extraneous electromagnetic disturbances. Furthermore, in each of the recited constructions, the standard A is revolubly supported at its upper and lower ends whereby it is stabilized against lateral displacement yet may be turned circumferentially to present the antenna in any horizontal direction around the standard, and by reason of the recited shielding of the transmission lines within the standard, turning of the standard may be manually effected during operation without interfering with reception of receiving apparatus.

The recited construction of the aerial is highly advantageous in that the antenna elements and the bearing element may be readily attached to and removed from the header which may be easily applied to and detached from the standard, and the sectional standard A assembled or disassembled, whereby the aerial may be packed and transported in a knock-down condition and easily assembled at the place of installation.

The placement of the antenna near the ceiling virtually eliminates the undesirable effect of bodily interference with the received signal. Such interference is common with the conventional indoor antenna which rests upon or about or is fastened on or within the receiver cabinet. The advantage of the high placement of the area is particularly apparent when it is seen that the body of a person rotating the antenna has no noticeable effect on the received signal nor do the bodies of any persons walking about the room have any noticeable effect on signal reception.

Furthermore by mounting the antenna on the upper end of a standard in an elevated position as herein set forth, the antenna will be disposed so as to afford ample head-room for persons walking therebeneath thereby obviating the hazard of injury to persons and damage to property incident to the usual arrangement of indoor aerials wherein antenna elements are subject to being accidently impaced by persons moving about a room wherein the antenna is located.

In matching the impedance of the antenna and the transmission line, any matching transformers or stubs may be contained within the standard.

While I have shown and described specific embodiments of the invention, it is not limited to the exact construction set forth, but embraces such changes and alterations as occasion may require coming within the meaning and scope of the appended claims.

I claim:

1. In an indoor aerial, a hollow standard having an open upper end, a header fixed on said upper end, an overhead bearing element on said header adapted to abut an overhead support in axial alignment with said standard, said header and bearing element being pivotally interconnected for rotary movement of the header relative to said bearing element, antenna elements carried on said header, transmission lines extending longitudinally of said standard interiorly thereof and means within said header conductively interconnecting said transmission lines to said antenna elements.

2. In an aerial, the combination of a tubular standard, an antenna supporting header on said standard having laterally leading apertures, antenna elements having portions extending into and engaged in said apertures and having portions projecting outwardly from said header, transmission lines leading from said elements and extending longitudinally of said standard interiorly thereof; said standard having a lower portion provided with an aperture through which said transmission lines lead, and means adapted to support said standard vertically for circumferential movement including a pivotal overhead support carried by said header.

3. In an indoor aerial, the combination with a standard having upper and lower ends with a bearing element carried on its upper end adapted to bear on an overhead support, and having a base element on its lower end adapted to seat on a floor, said standard also embodying means for clamping said bearing and base elements against the support and floor to hold the standard upright, and said standard being turnable circumferentially relative to said base and bearing elements, of an antenna carried on the upper end of said standard; in which said antenna embodies a header interposed between the upper end of said standard and said bearing element, and wherein said standard is tubular, together with transmission lines extending longitudinally of said standard interiorly thereof and leading from the upper end of said standard to said antenna through said header.

References Cited by the Examiner

UNITED STATES PATENTS

| 2,299,218 | 10/1942 | Fener | 343—882 X |
| 2,496,646 | 2/1950 | Winer | 343—890 X |
| 2,512,682 | 6/1950 | Salinger et al. | 343—797 |
| 2,521,798 | 9/1950 | Leonard | 343—878 X |
| 2,642,754 | 6/1953 | De Conti | 343—763 |
| 2,941,669 | 6/1960 | Palay et al. | 211—86 X |
| 3,017,632 | 1/1962 | Bernard | 343—878 X |
| 3,018,989 | 1/1962 | Frazelle | 211—86 |
| 3,084,769 | 4/1963 | Collier | 343—890 |
| 3,143,331 | 8/1964 | Corey | 248—356 |
| 3,158,866 | 11/1964 | Powers | 343—882 |

FOREIGN PATENTS

| 628,708 | 10/1961 | Canada. |
| 700,928 | 12/1963 | Great Britain. |

OTHER REFERENCES

Noll and Mandl: Television and FM Antenna Guide, May 29, 1951, pp. 156, 157.

ELI LIEBERMAN, *Primary Examiner.*